G. L. SMITH.
VEHICLE SHIELD.
APPLICATION FILED APR. 27, 1911.
1,036,018.
Patented Aug. 20, 1912.
2 SHEETS—SHEET 1.
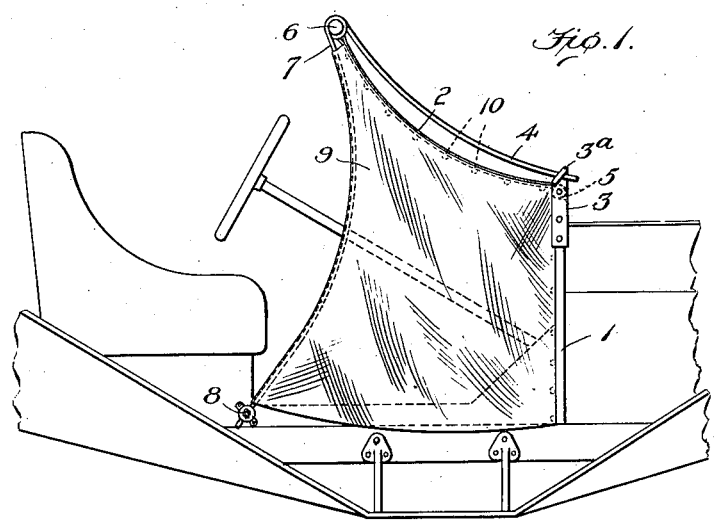
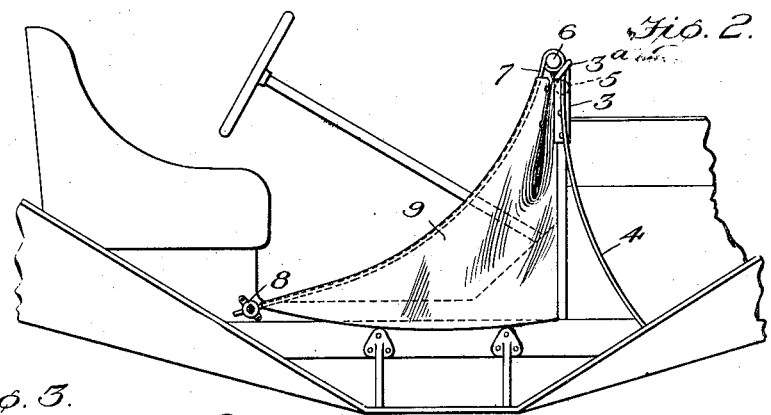
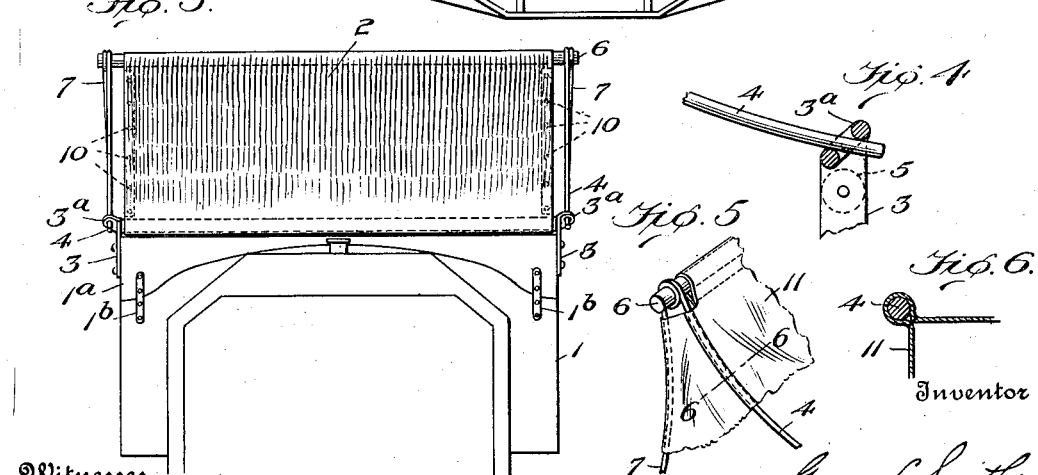
Witnesses
Edwin L. Bradford
G. P. Ritter
Inventor
George L. Smith
By Ritter & Ritter
His Attorneys G. L. SMITH.
VEHICLE SHIELD.
APPLICATION FILED APR. 27, 1911.
1,036,018.
Patented Aug. 20, 1912.
2 SHEETS—SHEET 2.
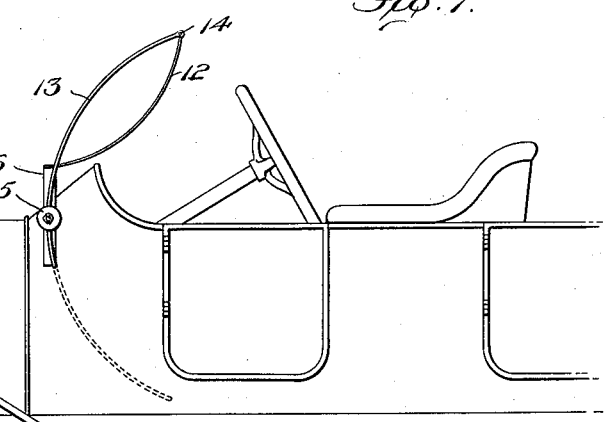
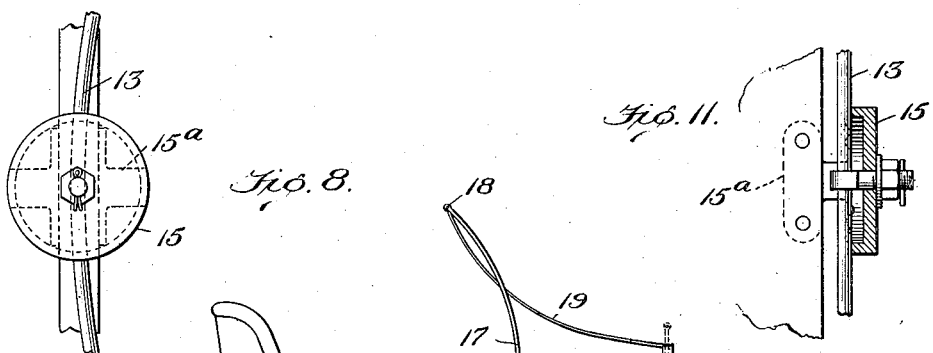
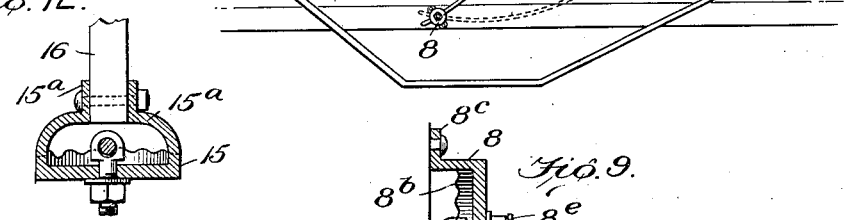
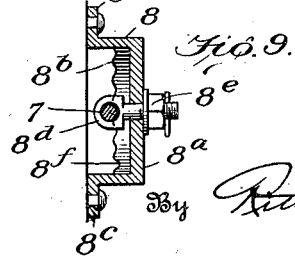

UNITED STATES PATENT OFFICE.

GEORGE L. SMITH, OF WASHINGTON, DISTRICT OF COLUMBIA.

VEHICLE-SHIELD.

1,036,018.  Specification of Letters Patent.  Patented Aug. 20, 1912.

Application filed April 27, 1911. Serial No. 623,633.

*To all whom it may concern:*

Be it known that I, GEORGE L. SMITH, a citizen of the United States, residing at Washington, in the District of Columbia, have invented certain new and useful Improvements in Vehicle-Shields; and I do hereby declare the following to be a full, clear, and exact description of the invention, such as will enable others skilled in the art to which it appertains to make and use the same.

My invention relates to the construction of wind and rain shields for vehicles and is particularly directed to the provision of a simple, strong, efficient and easily manipulated device of this character which is especially suitable for use upon automobiles.

The principal feature of my invention, generally stated, consists in combining with the body of a motor vehicle a wind deflector formed of a water proof fabric or other flexible material, one end or edge of said flexible deflector being connected to the dash or vehicle body and the other end or edge being adapted to be supported in raised or operative position by means of supporting members which are movably mounted upon the vehicle body and serve, when the shield is in use, to maintain the upper end or edge of the deflector in a vertically and laterally displaced position with respect to the lower end or edge thereof.

A further feature of my invention consists in employing resilient frame members to support the wind deflector and in movably mounting said members on the vehicle body by means of clamp devices, the resilience of the frame members serving to prevent accidental movement of the latter with respect to the clamp devices.

In the drawings chosen for the purpose of illustrating my invention, the scope whereof is pointed out in the claims, Figure 1 is a side elevation of a wind shield embodying my invention shown as applied to a common form of automobile body, the parts being in the positions they occupy when the shield is in raised or operative position; Fig. 2 is a side elevation of the devices shown in Fig. 1, the wind shield being in lowered position; Fig. 3 is a front elevation of the devices illustrated in Figs. 1 and 2, the wind shield being raised as in Fig. 1; Fig. 4 is a detail view, partly in side elevation and partly in section, showing one of the devices employed for movably mounting the frame members of the wind shield on the vehicle body; Fig. 5 is a detail perspective view illustrating a modified method of attaching the deflector and side curtains to the supporting frame shown in the preceding views; Fig. 6 is a detail sectional view, taken on the line 6—6, Fig. 5; Fig. 7 is a side elevation of a modified form of wind shield embodying my invention, the shield being illustrated in raised position and shown as adapted to another well known form of automobile body; Fig. 8 is a side elevation of a further modified form of wind shield embodying my invention, the device being shown in raised position and applied to another form of automobile body; Fig. 9 is a detail sectional view of one of the devices by which the frame members of the wind shields illustrated in Figs. 1 to 6, inclusive, and in Fig. 8 are movably mounted on the vehicle body; Figs. 10, 11 and 12 are detail views in side elevation, vertical central section and horizontal central section, respectively, of one of the devices whereby the form of wind shield shown in Fig. 7 is movably mounted on the vehicle body.

Like symbols refer to like parts wherever they occur.

I will now proceed to describe my invention more fully, so that others skilled in the art to which it appertains may apply the same.

In the form of construction shown in Figs. 1 to 6, inclusive, of the drawings, 1 is the dash of the vehicle body and 2 the wind deflector, the latter being formed of flexible material which is preferably water proof. In order to readily attach the deflector 2 to the dash the latter, if its upper edge be not initially straight, is preferably built up to provide such a straight edge by securing an upwardly extending filler 1ª thereto by means of straps or plates 1ᵇ which are screwed or bolted to the dash and filler, as more particularly shown in Fig. 3.

Secured to the upper outer ends of the dash filler are frame supporting members 3 that are formed with perforated lugs 3ª through which the resilient, deflector supporting, frame members 4 are slidably and angularly movable and by which said frame members are adapted to be flexed transversely of their direction of length and thereby yieldingly clamped and maintained in raised or operative position, the axes of the apertures in the lugs 3ª being for this purpose inclined to the general direction of sliding, turning movement of the resilient frame members 4 so that said members automatically bind in or are clamped by the lugs 3ª, as shown in Fig. 4, when the wind shield is in raised position.

The lower end or edge of the deflector 2 is preferably secured to the body of the vehicle through the intervention of an ordinary curtain roller or spring roller 5 which is journaled in the frame supporting and guiding members 3 in such manner as to permit the deflector to roll upon it when the shield is lowered; but, as shown in Figs. 7 and 8, the lower end of the deflector 2, if desired, may be directly connected to the dash or body of the vehicle. The upper end of the deflector is attached to the transversely extending stretcher bar 6 of the frame, a convenient means of attachment being to form a hem or pocket at this end of the deflector for the reception of the stretcher bar.

The resilient frame members 4, which, as shown, are preferably curved, may be conveniently connected to the stretcher bar 6 by forming at their upper ends eyes which are adapted to receive the stretcher bar, these parts being thus loosely connected. The frame members 7, which may be similarly connected to the stretcher bar at their upper ends and are also preferably curved, are mounted upon the body of the vehicle so as to be movable with respect thereto, the clamp devices 8 by which such frame members 7 are mounted upon the body being preferably of a character which will permit said frame members not only to pivot thereon but to be capable of a sliding movement as well. The preferred form of these clamp devices 8 comprises a body portion 8ª having oppositely disposed curved locking flanges 8ᵇ which are formed with serrations or undulations that are adapted to receive the resilient frame members 7, the body portion 8ª being provided with perforated lugs 8ᶜ forming means whereby the clamp may be attached to the vehicle and being also formed with a central aperture which is adapted to permit the passage of the threaded stem of a clip or eye bolt 8ᵈ through which the frame member 7 extends, a nut 8ᵉ being employed to place the frame member under sufficient strain to clamp it in the undulations of the locking flanges 8ᵇ firmly enough to prevent it from accidentally rotating or sliding when the shield is in service. In order to permit the frame members 7 to readily slide through their respective clamp devices 8 when it is desired to change the height of the stretcher bar end of the deflector 2, one of the undulations 8ᶠ on each of the locking flanges 8ᵇ of the clamps is preferably somewhat deeper than the others, the deeper undulations of each clamp being arranged opposite each other so that the frame members 7 when rotated on their bolts 8ᵈ to proper position may be easily adjusted up or down to the desired height, as will be readily understood.

For the better protection of the occupants of the vehicle flexible side curtains may be employed, as shown more particularly in Figs. 1, 2 and 5. If, as shown in Figs. 1, 2 and 3, a spring roller 5 is used, the side curtains 9, which are permanently attached at their front and rear edges, respectively, to the dashboard and the frame members 7, should be detachably connected to the lateral edges of the deflector 2 so as to permit the latter to roll upon the roller 5 when the frame is moved to lowered position as shown in Fig. 2. The detachable connection between the deflector 2 and flexible side curtains 9 may be conveniently effected by means of ordinary snap fastenings placed at intervals as indicated at 10. If it is desired to employ side curtains without employing a spring roller 5, the deflector and side curtains may be formed in a single piece 11 as shown in Fig. 5, the front edges of the side curtains and deflector being directly connected to the dash of the vehicle and the members 4, 6 and 7 of the shield supporting frame being sheathed in suitable hems formed in the deflector and side curtains.

Fig. 7 of the drawings illustrates a modified form of construction in which the brace rods 4 shown in the structure heretofore described are omitted. In this form of construction the flexible deflector 12 is connected to a supporting frame which consists of a pair of similarly curved resilient frame members 13 which are connected at their upper ends by a transversely extending stretcher bar 14 to which the upper end of the deflector is secured. The frame members 13 are slidably and rotatably connected to the body of the vehicle by means of clamp devices 15 which may be secured to the opposite ends of the dash 16. These clamps 15 are precisely identical in form and function with the clamp devices 8 heretofore described, except that attaching lugs 15ª suitable for connection to the vertically extending dash 16 are substituted for the attaching lugs 8ᶜ of the clamp 8. When the wind shield is lowered the frame members 13 slide through the clamps 15 and assume positions at the side of the body of the vehicle, as indicated in dotted lines in Fig. 7.

In the modified form of construction illustrated in Fig. 8 the brace rods 4 are likewise omitted and the supporting frame comprises resilient parallel curved frame members 17 which at their lower ends are slidably and pivotally connected to the body of the vehicle preferably by clamps 8 such as heretofore described. The upper ends of the frame members 17 are connected by a stretcher bar 18 which extends transversely of the vehicle as shown in the principal figures of the drawings, the flexible deflector 19 being connected at its upper end to the stretcher bar and being attached at its lower end to the dash 20 of the vehicle. When the wind shield is not in use the frame members 17 thereof will occupy positions at the side of the body of the vehicle as indicated in dotted lines in Fig. 8.

Having thus described my invention, what I claim and desire to secure by Letters Patent is:

1. In a device of the character indicated the combination with the body of a vehicle, of a flexible deflector connected thereto, frame members movably mounted upon the body of the vehicle and connected to said deflector, means for slidably and pivotally connecting said frame members to the vehicle, and means operative by a pivotal movement of the frame members for yieldingly restraining pivotal and sliding movements of said frame members with respect to the vehicle body, the upper ends of said frame members being movable vertically and laterally toward and from the lower end of the deflector and said frame members being slidable through their respective points of pivotal connection to the vehicle.

2. In a device of the character indicated, the combination with the body of a vehicle, of a flexible deflector connected thereto, frame members slidably and rotatably mounted upon the body of the vehicle and connected to said deflector, and means operated by the movement of the frame members for retaining the said frame members in fixed position with respect to the vehicle body, said frame members being pivotally connected to said vehicle body by said retaining means and being slidable through said retaining means.

3. In a device of the character indicated, the combination with the body of the vehicle, of a deflector, resilient frame members rotatably mounted upon the vehicle body and connected to the deflector, and clamp devices mounted on the vehicle body and frictionally engaging said resilient frame members, said clamp devices constituting means for flexing the frame members upon a rotatory movement of said frame members with respect to the vehicle body.

4. In a device of the character indicated, the combination with the body of a vehicle, of a flexible deflector connected thereto, resilient frame members movably mounted upon the vehicle body and connected to said deflector, and means for retaining the said frame members in fixed position with respect to the vehicle body, said means including devices operating to vary the flexure of the resilient frame members upon a change in the angular positions of said frame members with respect to the vehicle body.

5. In a device of the character indicated, the combination with the body of a vehicle, of a flexible deflector, resilient frame members slidably and pivotally connected to the vehicle body, and means for flexing said resilient frame members upon a rotation of the latter about their respective points of pivotal connection to the vehicle body.

6. In a device of the character indicated, the combination with the body of the vehicle, of a flexible deflector connected thereto, curved resilient frame members movably mounted upon the vehicle body and connected to said deflector, and clamp devices mounted on the vehicle body and engaging the resilient frame members to yieldingly maintain said frame members in fixed position, said clamp devices being provided with means for flexing said resilient frame members upon an angular movement of the latter.

7. In a device of the character indicated, the combination with the body of a vehicle, of a flexible deflector connected thereto, resilient frame members movably mounted upon the vehicle body and connected to the deflector, and clamp devices mounted on the vehicle body and pivotally connecting said frame members to said vehicle body, said clamp devices being provided with serrated locking flanges engaging their respective frame members and being also provided with means for flexing said frame members transversely of their direction of length, and said frame members being slidable through said clamps.

8. In a device of the character indicated, the combination with the body of a vehicle, of a roller secured thereto, a flexible deflector mounted thereon, a stretcher bar connected to said deflector, resilient frame members connected to said stretcher bar and slidable and angularly movable with respect to the vehicle body, frame members connected to said stretcher bar and pivotally movable with respect to the vehicle body, and clamp devices for flexing said resilient frame members transversely of their direction of length upon an angular movement thereof with respect to the clamp devices, said resilient frame members being simultaneously slidable and angularly movable with respect to said clamp devices, and said clamp devices constituting means for yieldingly retaining said resilient frame members in fixed position.

9. In a device of the character indicated, the combination with the body of a vehicle, of clamp devices, a flexible deflector connected to said vehicle body, a stretcher bar connected to said deflector, resilient frame members connected to said stretcher bar and slidably and angularly movable with respect to said clamp devices, frame members connected to said stretcher bar and pivotally movable with respect to the vehicle body, and side curtains movable with said frame members, said clamp devices engaging the corresponding resilient frame members and constituting means for flexing said resilient members transversely of their direction of length and for yieldingly retaining them in fixed position with respect to the vehicle body.

10. In a device of the character indicated, the combination with the body of a vehicle, of a roller extending transversely thereof, means on which said roller is journaled for mounting said roller on the vehicle body, a flexible deflector mounted on said roller, clamp devices connected to said vehicle body, resilient frame members engaging said clamp devices and slidably and angularly movable with respect thereto, a stretcher bar connecting said resilient frame members and said deflector, and means for yieldingly maintaining said resilient frame members in fixed position, said means including said clamp devices, and said clamp devices being adapted to flex said frame members transversely of their direction of length upon an angular movement of the latter with respect to the vehicle body.

In testimony whereof I affix my signature, in the presence of two subscribing witnesses.

GEORGE L. SMITH.

Witnesses:
THOMAS DURANT,
G. P. RITTER.